United States Patent
Zhu et al.

(10) Patent No.: US 7,877,097 B2
(45) Date of Patent: Jan. 25, 2011

(54) REUSE PATTERN NETWORK SCHEDULING USING INTERFERENCE LEVELS

(75) Inventors: Chenxi Zhu, Gaithersburg, MD (US); Dorin Viorel, Calgary (CA); Jagan Seshadri, Calgary (CA); Jonathan Agre, Brinklow, MD (US); Wei-Peng Chen, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 711 days.

(21) Appl. No.: 11/777,385

(22) Filed: Jul. 13, 2007

(65) Prior Publication Data

US 2008/0108359 A1 May 8, 2008

Related U.S. Application Data

(60) Provisional application No. 60/864,498, filed on Nov. 6, 2006.

(51) Int. Cl.
*H04W 40/00* (2009.01)

(52) U.S. Cl. .................. 455/446; 370/329; 370/331; 445/450; 445/553.1

(58) Field of Classification Search ............. 370/329, 370/331; 455/46, 447, 553.1, 562.1
See application file for complete search history.

(56) References Cited

U.S. PATENT DOCUMENTS

| | | | |
|---|---|---|---|
| 6,718,184 | B1 | 4/2004 | Aiken et al. |
| 7,006,823 | B2 | 2/2006 | Shurvinton et al. |
| 7,068,977 | B1 | 6/2006 | Yang et al. |
| 7,327,812 | B2 | 2/2008 | Auer |
| 7,633,894 | B2 | 12/2009 | Cruz et al. |
| 7,643,429 | B2 | 1/2010 | Zhu et al. |
| 2002/0075967 | A1 | 6/2002 | Voyer |
| 2002/0196804 | A1 | 12/2002 | Ishiguro et al. |
| 2003/0002460 | A1* | 1/2003 | English ................. 370/331 |
| 2003/0073441 | A1 | 4/2003 | Fattouch |
| 2004/0136445 | A1 | 7/2004 | Olson et al. |
| 2005/0069024 | A1 | 3/2005 | Li et al. |
| 2005/0096061 | A1* | 5/2005 | Ji et al. .................. 455/450 |
| 2005/0096062 | A1* | 5/2005 | Ji et al. .................. 455/450 |
| 2006/0019701 | A1* | 1/2006 | Ji ......................... 455/553.1 |
| 2006/0045117 | A1* | 3/2006 | Qi et al. ................. 370/445 |
| 2006/0159004 | A1 | 7/2006 | Ji |
| 2007/0207769 | A1 | 9/2007 | Hara |
| 2008/0165727 | A1* | 7/2008 | Xiaoben et al. ......... 370/329 |

OTHER PUBLICATIONS

European Office Action issued on Jan. 5, 2009 in corresponding European Patent Application 07118158.0

(Continued)

*Primary Examiner*—Kent Chang
*Assistant Examiner*—Dinh P Nguyen
(74) *Attorney, Agent, or Firm*—Staas & Halsey LLP

(57) ABSTRACT

Interference levels occurring at one or more stations are mapped, and a reuse pattern is generated, based on the mapped interference levels, including one or more reuse sets of stations capable of sharing a transmission resource. The stations within each reuse set are listed in increasing order based on their respective interference levels, and an additional station is added to a reuse set, as long as the cumulative interference level within the reuse set is below a threshold interference level and the additional station is not already listed in another reuse set. A network schedule is updated based on the reuse pattern to increase bandwidth efficiency in the network.

23 Claims, 4 Drawing Sheets

OTHER PUBLICATIONS

Part 16: Air Interface for Fixed and Mobile Broadband Wireless Access Systems, Multihop Relay Specification, IEEE P802.16j/D1, Aug. 8, 2007.
U.S. Appl. No. 11/777,494, filed Jul. 13, 2007, Chenxi Zhu, et al., Fujitsu Limited.
U.S. Appl. No. 12/619,251, filed Nov. 16, 2009, Chenxi, Zhu, et al., Fujitsu Limited.

* cited by examiner

REUSE PATTERN NETWORK SCHEDULING USING INTERFERENCE LEVELS

CROSS-REFERENCE TO RELATED APPLICATIONS

This application is based on, and claims the benefit of, U.S. Provisional Application titled "REUSE PATTERN NETWORK SCHEDULING ALGORITHM FOR OFDMA NETWORKS USING RELAY STATIONS", U.S. Ser. No. 60/864,498, filed Nov. 6, 2006, inventors Chenxi Zhu, Dorin Viorel, Jagan Seshadri, Jonathan Agre and Wei-Peng Chen, and which is incorporated herein by reference in its entirety.

BACKGROUND OF THE INVENTION

Description of the Related Art

Wireless communication networks have become increasingly popular and generally include a base station that provides service to a cell area located around the base station. Subscriber stations, including mobile stations (such as cell phones, etc.), are able to communicate with the base station when they are within the service area (such as the cell area) of the base station.

Interference among stations in the same or different cells of the network can cause significant problems The use of relay stations in the network can complicate interference problems.

SUMMARY OF THE INVENTION

Various embodiments of the present invention provide a method and apparatus which (a) maps interference levels occurring at one or more stations in a wireless network; and (b) generates a reuse set, based on the mapping, of stations, included in said one or more stations, capable of sharing a transmission resource.

Various embodiments of the present invention provide a method and apparatus which (a) maps interference levels occurring in one or more stations in an Institute of Electrical and Electronics Engineers (IEEE) 802.16 system, each station of said one or more stations being a base station or a relay station; and (b) generates a reuse pattern, based on the mapping, including one or more reuse sets of stations, included in said one or more stations, capable of sharing a transmission resource.

The above embodiments of the present invention are simply examples, and all embodiments of the present invention are not limited to these examples or to including all the features described in the Summary of the Invention section of this application.

Additional features of the invention will be set forth in part in the description which follows, and, in part, will be obvious from the description, or may be learned by practice of the invention.

DETAILED DESCRIPTION OF THE PREFERRED EMBODIMENTS

Figure 1:
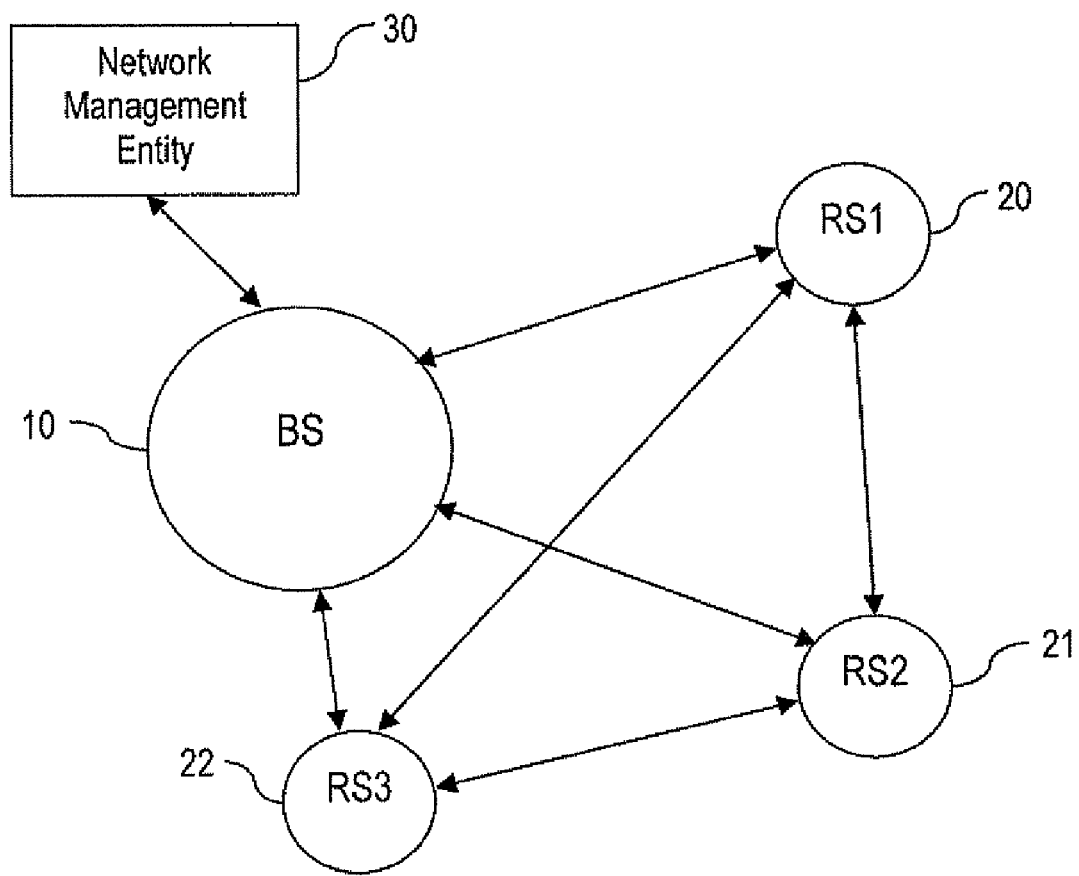
FIG. 1 is an illustration of an example of a wireless network topology involving a base station, a network management entity (such as a base station controller) and three relay stations operating in an OFDMA network under the IEEE 802.16j standard.

Reference will now be made in detail to the present preferred embodiments of the present invention, examples of which are illustrated in the accompanying drawings, wherein like reference numerals refer to like elements throughout.

In wireless communication networks, due to such effects as shadowing arising from blockage by buildings and other obstructions between transmission/reception antennas, there exist dead zones in which communication with the base station is not possible, despite being within the service area. To combat this problem, in a wireless network, such as for example, an Orthogonal Frequency Division Multiple Access (OFDMA) network, relay stations can be employed for providing enhanced transmission capabilities by acting as intermediaries between mobile stations operating in the network and the base station. In this manner, a mobile station that is incapable of connecting directly to a base station within its cell service area may still connect indirectly to the base station by first communicating with a relay station that does have a direct link, or possibly an indirect link through additional relay stations, to the base station.

A problem arises, however, in that greater levels of interference are produced in the network with the addition of base and relay stations. Spatial reuse of the spectrum in the network is required to increase the spectrum efficiency and total capacity of the network, subject to the requirement the interference caused by concurrent transmissions needs to be carefully managed. Since the increased intranet interference degrades the carrier to interference-plus-noise ration (CINR) for the impacted links, properly scheduling the concurrent transmissions to mitigate the interference levels impacts directly the quality of service (QoS) on these links.

Therefore, a network entity schedule algorithm can be defined that reduces the intranet interference between different stations (either base stations or relay stations) operating within the wireless network (e.g., an OFDMA network) while at the same time maximizes the spatial reuse of the radio resource, thereby optimizing CINR degradation and thus allowing higher coding rates to be used on the impacted links.

FIG. 1 is an illustrative example of a wireless network topology involving a base station and three relay stations operating in an OEDMA network. The network cell includes a base station (BS) 10, a first relay station (RS1) 20, a second relay station (RS2) 21, a third relay station (RS3) 22 and a network management entity 30. This example topology is intended to show a single possibility of a network cell, and embodiments of the present invention are not limited to any particular topology. For example, embodiments of the present invention are not limited to a network with the specific number of base and/or relay stations in the specific configuration shown in FIG. 1.

In the specific example in FIG. 1, RS1 20 can communicate directly with BS 10 via the transmission link between BS 10 and RS1 20, or indirectly via the transmission link from BS 10 to RS2 21 and then through the transmission link from RS2 21 to RS1 20.

Various embodiments of the present invention assume a fixed reuse pattern. That is, the base stations and relay stations are assumed to be in fixed positions and each transmitter (either a base station or a relay station) transmits with a fixed power assigned by network management entity 30. However, the present invention is not limited to a fixed reuse pattern.

As the algorithms described herein are computationally demanding, various embodiments of the present invention are intended for use in networks where, for example, each base station and relay station generates its own transmission schedule. However, the present invention is not limited to each base and relay station generating its own transmission schedule.

Figure 2:
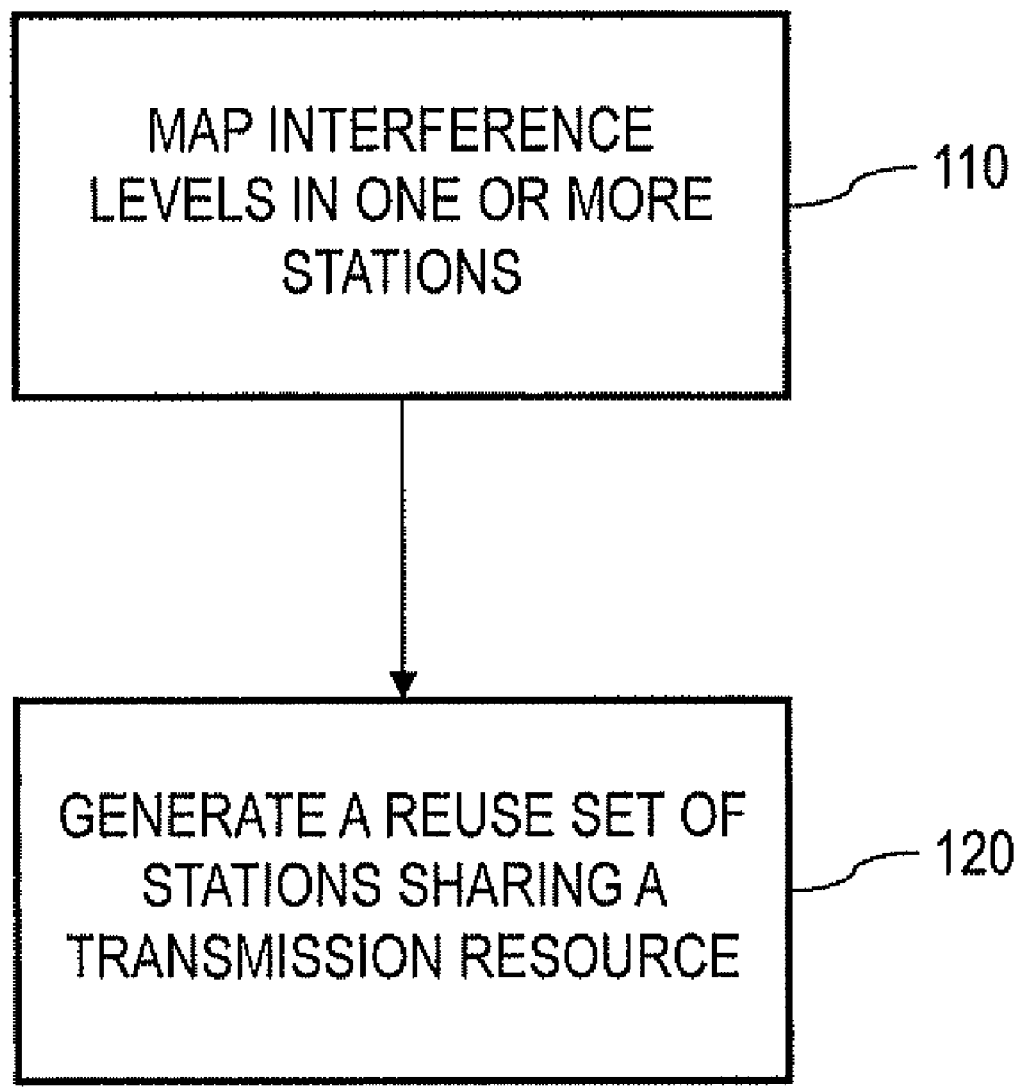
FIG. 2 is a flowchart illustrating the method of mapping interference levels occurring at one or more stations in a wireless network and generating a reuse set, according to embodiments of the present invention.

FIG. 2 is a flowchart illustrating a method of mapping interference levels occurring at one or more stations in a wireless network and generating a reuse set, according to embodiments of the present invention. Referring now to FIG. 2, at operation 110, interference levels occurring at one or more stations in a wireless network are mapped.

For example, network management entity 30 (see FIG. 1) produces a mapped interference matrix based, for example, on noise plus interference measurements performed by different stations (e.g., base station 10) positioned within a cluster of cells subject to the interference mapping. That is, the interference matrix includes the noise plus interference generated by each station upon each other station.

A mapping interference mode is, for example, a maintenance type of operation, in which an implementation-specific network interference mapping pattern is transmitted from a station using, for example, fixed power. As an example, each relay station within the cluster of cells subject to the interference mapping transmits within the same uplink (UL) frame, a specific UL interference pattern based, for example, on a specific UL sounding sequence. Upon receiving the UL interference patterns, all stations within the cluster of cells execute, for example, burst noise power measurements on the received UL interference patterns. Of course, the present invention is not limited to any particular UL interference pattern based on any specific UL sounding sequence, or to stations executing any particular burst noise power measurements.

For example, the burst power measurements executed by the stations are implementation specific and could include, for example, Received Signal Strength Indication (RSSI) measurements or, for example, Signal to Interference Plus Noise Ration (SINR) measurements. These burst power measurements are, for example, proportional with the interference path between stations sending and receiving the UL interference patterns. Of course, the present invention is not limited to any particular measurements being included in the executed burst power measurements.

According to various embodiments of the present invention, the network interference mapping pattern is scheduled, for example, periodically by network management entity 30. Each base station (e.g. base station BS 10) then, for example, averages the burst power measurements from each station and transmit the averaged measurements to network management entity 30 to generate the interference matrix. However, the present invention is not limited to periodic scheduling of network interference mapping, or to any particular types of calculations.

An example interference matrix (INT) shown below maps the noise plus interference caused by each station upon each other station in the wireless network. As shown in this example, $NI_{i,j}$ represents the noise (N) plus interference (I) caused by station "i" upon station "j". The effect is not necessarily symmetrical due to the potential different transmission powers of the stations, although it is assumed that each transmitter transmits with a fixed power. This example shows a square Y×Y matrix, but the matrix could also be an Y×M matrix.

$$INT = \begin{bmatrix} NI_{1,1} & NI_{1,2} & NI_{1,3} \\ NI_{2,1} & NI_{2,2} & NI_{2,3} \\ NI_{3,1} & NI_{3,2} & NI_{3,3} \end{bmatrix}$$

The above-described mapping the interference levels by estimation of the interference matrix is described, for example, in U.S. Provisional Application No. 60/864,491, titled "INTERFERENCE MAPPING PROCEDURE FOR OFDMA NETWORKS USING RELAY STATIONS", inventors Chenxi Zhu, Dorin Viorel, Jagan Seshadri, Jonathan Agre and Wei-Peng Chen, filed Nov. 6, 2006, and U.S. Provisional Application No. 60/891,096, titled "INTERFERENCE MAPPING PROCEDURE FOR OFDMA NETWORKS USING RELAY STATIONS", inventors Chenxi Zhu, Dorin Viorel, Jagan Seshadri, Jonathan Agre and Wei-Peng Chen, filed Feb. 22, 2007, and U.S. utility patent application Ser. No. 12/619,251 titled "INTERFERENCE MEASURING AND MAPPING METHOD AND APPARATUS FOR WIRELESS NETWORKS USING RELAY STATIONS", inventors Chenxi Zhu, Dorin Viorel, Jagan Seshadri, Jonathan Agre and Wei-Peng Chen, filed concurrently on the same day herewith, and which are incorporated herein by reference in their entirety. However, the present invention is not limited to this specific manner of mapping the interference levels, and other manners of mapping the interference levels can be implemented. More specifically, the present invention is not limited to the mapping the interference levels by estimation of the interference matrix as described above, and in U.S. Provisional Application No. 60/864,491, titled "INTERFERENCE MAPPING PROCEDURE FOR OFDMA NETWORKS USING RELAY STATIONS", inventors Chenxi Zhu, Dorin Viorel, Jagan Seshadri, Jonathan Agre and Wei-Peng Chen, filed Nov. 6, 2006, and U.S. Provisional Application No. 60/891,096, titled "INTERFERENCE MAPPING PROCEDURE FOR OFDMA NETWORKS USING RELAY STATIONS", inventors Chenxi Zhu, Dorin Viorel, Jagan Seshadri, Jonathan Agre and Wei-Peng Chen, filed Feb. 22, 2007, and U.S. utility patent application Ser. No. 12/619,251 titled "INTERFERENCE MEASURING AND MAPPING METHOD AND APPARATUS FOR WIRELESS NETWORKS USING RELAY STATIONS", inventors Chenxi Zhu, Dorin Viorel, Jagan Seshadri, Jonathan Agre and Wei-Peng Chen, filed concurrently on the same day herewith. Accordingly, the present invention is not limited to any particular manner of mapping interference levels in operation 110.

From operation 110, the process moves to operation 120, where a reuse set of stations capable of sharing a transmission resource is generated based on the mapping operation 110. Specific operations of generating the reuse set are described in detail with reference to FIG. 3 described below.

Figure 3:
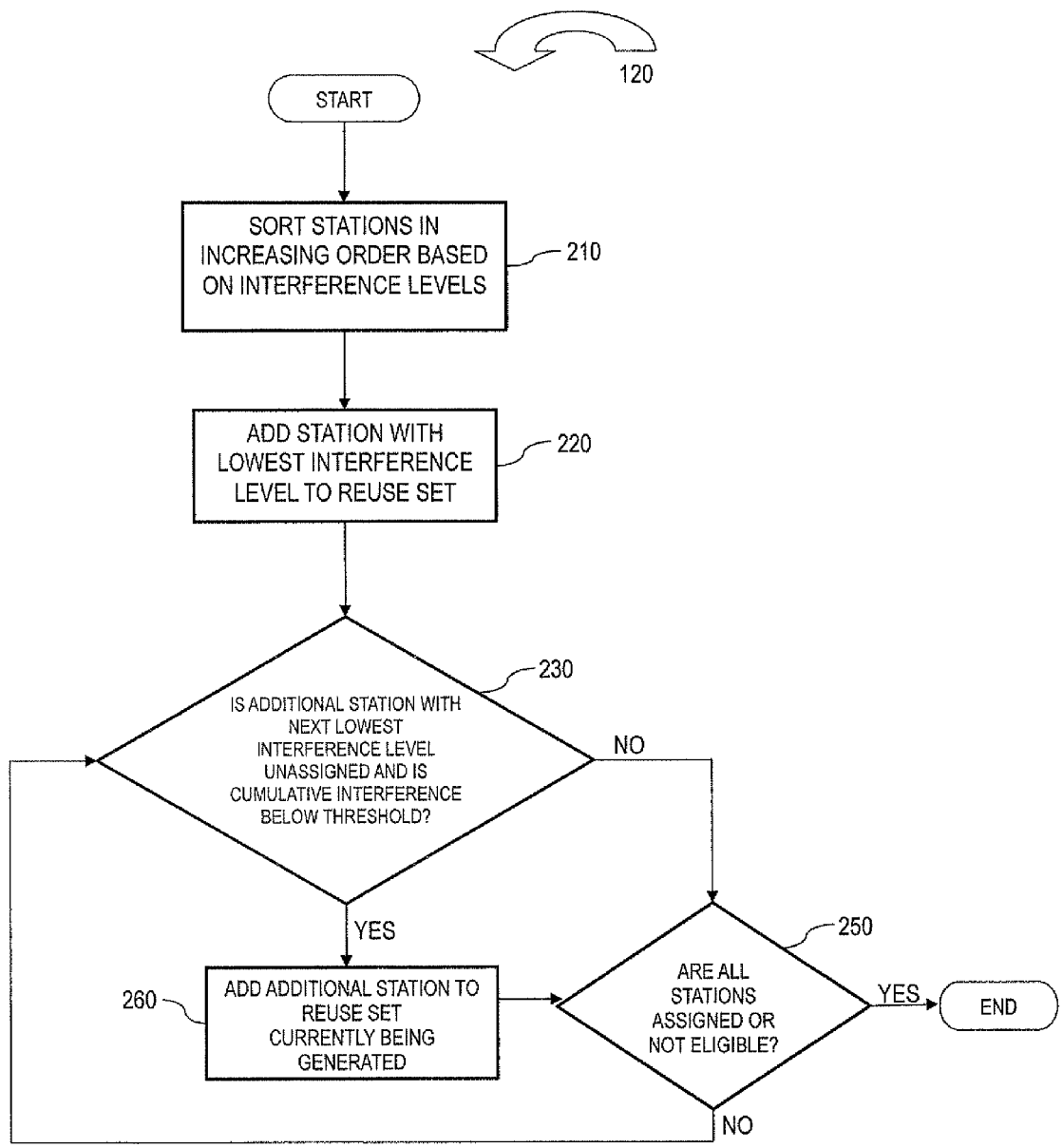
FIG. 3 is a flowchart illustrating the method of generating a reuse set, according to embodiments of the present invention.

FIG. 3 is a flowchart illustrating a method of generating a reuse set, according to an embodiment of the present invention. Referring now to FIG. 3, in operation 210, the one or more stations within the wireless network are sorted, for example, by network management entity 30 in, for example, increasing order based on their respective interference levels mapped by operation 110 (see FIG. 2) described above. The present invention is not limited to sorting in an increasing order, and other variations of a sorting procedure can be implemented. In addition, the sorting is not limited to being performed by network management entity 30, and could be performed by other entities in the network.

From operation 210, the process moves to operation 220, where network management entity 30 determines, for example, the station with the lowest interference level (i.e., the smallest $NI_{i,j}$), based on the mapping operation 110, and this station is added to the reuse set. The present invention is not limited to determining the station with the lowest interference level, and other variations can be implemented, based on the sorting procedure implemented in operation 210. In addition, the determination is not limited to being performed by network management entity 30, and could be performed by other entities in the network.

From operation 220, the process moves to operation 230, in which it is determined, using the sorting procedure 210, whether the station with the next lowest interference level is unassigned to a reuse set and whether the cumulative interference level within the reuse set currently being generated would be below a threshold interference level for all the stations already in the reuse set and for the station under consideration for being added to the reuse set if the station with the next lowest interference level is added to the reuse set currently being generated.

The threshold interference level is a predetermined level set by, for example, the network management entity 30 (see FIG. 1). The threshold interference level is, for example, fixed and is determined, for example, by simulations based on an effective coding rate calculated by averaging transmission rates to mobile stations by the base and/or relay stations. The threshold interference level reflects, for example, the maximal total interference that a downlink transmitter (a base station or a relay station) can tolerate is allowed to cause to other cells sharing the same spectrum. The network management entity 30 is capable of determining, for example, the maximal transmission power used by each base and relay station. However, the present invention is not limited to the predetermined level of the threshold interference level being set by the network management entity 30 or to being fixed or to being determined based on any particular simulation.

If both of the conditions checked in operation 230 are not met, the process moves to operation 250, where it is checked if every station has been either assigned to a reuse set (including previous constructed reuse sets and the current one), or is not eligible to the current reuse set. If both conditions are not met, the process returns to operation 230, where the next station in the sorted list of stations, with a next lowest interference level, is checked to determine whether it is already assigned to a reuse set or the cumulative interference level within the reuse set currently being generated would be below a threshold interference level if the current station being checked is added to the reuse set currently being generated.

If both of the conditions checked in operation 230 are satisfied, the process moves to operation 260 in which the station being checked is, for example, added to the reuse set currently being generated. From operation 260, the process moves to operation 250, where it is determined, for example, whether all stations are assigned to a reuse set.

The process including operations 230, 250 and 260 is reiterated, for example, until all stations have been either assigned to a reuse set or determined not eligible to any reuse sets constructed as determined by operation 250. When operation 250 determines that, for example, all stations are assigned, the process of constructing a reuse set ends. The process may repeat and generate a reuse set each time, until all stations have been assigned to some reuse set.

The process illustrated in FIG. 3 assures that each generated reuse set includes as many stations (relay and/or base stations) as possible, while still having a cumulative interference level below the threshold interference level. Thus, each generated reuse set includes the maximum number of stations while tolerating the cumulative interference when transmitting with a predetermined effective coding rate and transmission power. As a result, each generated reuse set includes one or more stations which are capable of sharing a transmission resource, including a frequency or a timeslot, or a combination of both.

Of course, the process in FIG. 3 is only one example of a process to generate a reuse set, and many variations are possible. The present invention is not limited to the specific example in FIG. 3. For example, the present invention is not limited to including each of the specific operations in FIG. 3. Moreover, there are many variations of the specific operations in FIG. 3 that can be implemented.

Figure 4:
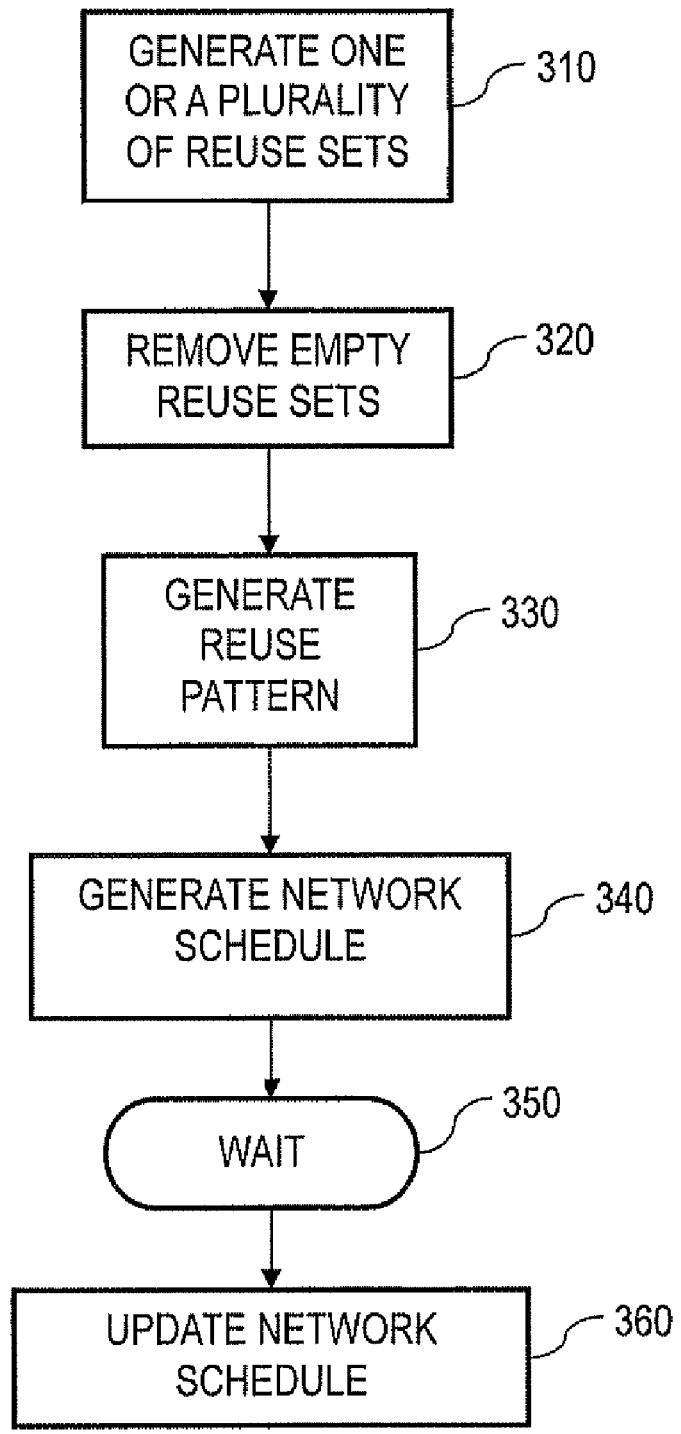
FIG. 4 is a flowchart illustrating the method of generating one or a plurality of reuse sets and a reuse pattern used to update a network schedule, according to embodiments of the present invention.

FIG. 4 is a flowchart illustrating the method of generating one or a plurality of reuse sets and a reuse pattern used to update a network schedule, according to an embodiment of the present invention. Referring now to FIG. 4, operation 310 represents the generation of one or a plurality of reuse sets using the reuse set generation operation described above (see FIG. 3).

From operation 310, the process moves to operation 320, in which, for example, any empty reuse sets (i.e., reuse sets including no base stations or relay stations) are removed. From operation 320, the process moves to operation 330, in which, for example, the remaining reuse sets are grouped to form a reuse pattern, including one or a plurality of reuse sets.

From operation 330, the process moves to operation 340, where, for example, the network management entity 30 or a base station 10 (see FIG. 1) generates a network schedule including the radio resources that base station and relay stations in each respective reuse set is allowed to use for its downlink access. The bandwidth can be efficiently allocated using, for example, the reuse pattern by assigning resources to individual reuse sets including a maximum number of base stations and relay stations, while, for example, maintaining a cumulative interference level below the predetermined threshold interference level. As an example, each station generates its own transmission schedule using the radio resource assigned to it by, for example, network management entity 30 or a base station 10.

From operation 340, the process moves to operation 350, where network management entity 30 or the base station 10 waits, for example, for a predetermined period of time before updating the network schedule. The base station may update the network interference matrix by having the transmission stations estimate the interference from other transmission stations, and collect and update the network load and/or congestion information. Because the computations at network management entity 30 or the base station 10 are intensive, the update may take place, for example, over tens of frames. For example, the network schedule can be set to update every ten seconds. However, the present invention is not limited to any particular period of time before updating the network schedule.

From operation 350, the process moves to operation 360, where the network schedule is updated after a predetermined period of time in order to assure that the network schedule optimally allocates transmission resources, based on the reuse pattern.

Of course, the process in FIG. 4 is only one example of a process to generate one or a plurality of reuse sets and a reuse pattern. The present invention is not limited to the specific example in FIG. 4. For example, the present invention is not limited to including each of the specific operations in FIG. 4. Moreover, there are many variations of the specific operations in FIG. 4 that can be implemented.

Various embodiments of the present invention provide a method and apparatus which (a) maps interference levels occurring at one or more stations in a wireless network; and (b) generates a reuse set, based on the mapping, of stations, included in said one or more stations, capable of sharing a transmission resource. Although not limited to any particular type of wireless network, various embodiments of the present invention are applicable for use within an IEEE 802.16 system, where each of the one or more stations is a base station or a relay station.

Various embodiments of the present invention provide a method and apparatus in which generating a reuse set includes (a) sorting one or more stations in increasing order based on their respective mapped interference levels; (b) beginning with a station, among the one or more stations, with the smallest interference level, adding the station to the reuse set; (c) adding an additional station with a next lowest interference level to the reuse set, as long as a cumulative interference level for every station within the reuse set is below a threshold interference level and the additional station is not already assigned to another reuse set; and (d) repeatedly adding an additional station, as described above, until each of the one or more stations is included in a reuse set.

Various embodiments of the present invention provide a method and apparatus which (a) generates a reuse pattern comprising one or a plurality of reuse sets; and (b) updates a network schedule, by a network management entity, based on the reuse pattern, to increase bandwidth efficiency.

Various embodiments of the present invention provide a system for generating a reuse group based on interference levels in an IEEE 802.16 network. In various embodiments of the present invention, the system (a) maps interference levels, occurring at one or more stations, each of said one or more stations being a base station or a relay station; and (b) generates a reuse pattern, based on the mapped interference levels, including one or more reuse sets of stations, included in said one or more stations, capable of sharing a transmission resource. In various embodiments of the present invention, within each reuse set, the stations are listed in increasing order based on their respective interference levels, and an additional station is added to a reuse set, as long as the cumulative interference level within the reuse set is below a threshold interference level and the additional station is not already listed in another reuse set. In various embodiments of the present invention, the system removes empty reuse sets. In various embodiments of the present invention, the system also generates a network schedule, by a network management entity, based on the reuse pattern to increase bandwidth efficiency in the network.

Various embodiments of the present invention are applicable to IEEE 802.16 networks, which includes amendments or extensions to IEEE 802.16. However, the present invention is not limited to IEEE 802.16 networks, and is applicable to other types of networks.

Similarly, various embodiments of the present invention are applicable to OFDMA networks. However, the present invention is not limited to OFDMA networks, and is applicable to other types of networks.

Various embodiments of the present invention are described herein with respect to "mobile" stations that communicate with base stations and relay stations in a network. However, the present invention is not limited to networks with "mobile" stations. Instead, a network might have many different types of stations, typically referred to a "subscriber" stations, which communicate with base and/or relay stations. A "mobile" station is one type of "subscriber" station.

According to embodiments of the present invention, the above described methods, apparatuses and systems can, for example, mitigate the intranet interference between different stations (either base stations or relay stations) operating within the wireless network (e.g., an OFDMA network), thereby optimizing CINR degradation and thus allowing higher coding rates to be used on the impacted links, and cause a related improvement on the spectral efficiency per link, considering the improvement in the related bandwidth efficiency.

U.S. utility application Ser. No. 11/777,494 titled "REUSE PATTERN NETWORK SCHEDULING USING LOAD LEVELS", inventors Chenxi Zhu, Wei-Peng Chen, Jonathan Agre, Dorin Viorel and Jagan Seshadri, filed concurrently on the same day herewith, and U.S. Provisional Application titled "Load-Based MMR Network Scheduling Algorithm With Frequency Reuse", U.S. Application Ser. No. 60/884,464, filed Jan. 11, 2007, inventors Chenxi Zhu, Dorin Viorel, Jagan Seshadri, Jonathan Agre and Wei-Peng Chen, and which are incorporated herein by reference in their entireties.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:
   mapping, by a computer, interference levels occurring at one or more stations in a wireless network; and
   generating, by a computer, a reuse set, based on the mapping, of stations, included in said one or more stations, capable of sharing a transmission resource, wherein said generating comprises:
   sorting the one or more stations in increasing order based on their respective mapped interference levels,
   beginning with a station, among the one or more stations, with a smallest interference level, adding the station to the reuse set, and
   adding an additional station with a next lowest interference level to the reuse set, as long as a cumulative interference level within the reuse set is below a threshold interference level and the additional station is not already assigned to another reuse set.

2. The method of claim 1, wherein if the cumulative interference level is not below the threshold interference level, the additional station is added to a new reuse set.

3. The method as in claim 2, wherein the network is an Institute of Electrical and Electronics Engineers (IEEE) 802.16 system, and each of said one or more stations is a base station or a relay station in the system.

4. The method of claim 1, wherein if the additional reuse set is already assigned to another reuse set, the additional reuse set is skipped.

5. The method of claim 1, further comprising:
   generating a plurality of reuse sets; and
   removing empty reuse sets that include no stations.

6. The method of claim 1, further comprising:
   generating a reuse pattern comprising one or a plurality of reuse sets; and
   generating a network schedule, by a network management entity, based on the reuse pattern, to increase bandwidth efficiency.

7. The method of claim 6, wherein the network schedule is updated at a predetermined time or at a time perceived necessary by a network controller based on network load condition.

8. The method of claim 1, wherein each station generates its own transmission schedule using a network schedule assigned to it by a network management entity.

9. The method of claim 6, wherein each station generates its own transmission schedule using the network schedule assigned to it by the network management entity.

10. The method of claim 1, wherein the threshold interference level is predetermined by a network management entity.

11. The method of claim 1, wherein the threshold interference level is determined based on an effective coding rate calculated by averaging transmission rates to mobile stations by the stations.

12. The method of claim 1, wherein the stations are fixed.

13. The method of claim 1, wherein the transmission resource is a frequency or a timeslot, or a combination of both.

14. A method comprising:
mapping, by a computer, interference levels occurring in one or more stations in an Institute of Electrical and Electronics Engineers (IEEE) 802.16 system, each station of said one or more stations being a base station or a relay station; and
generating, by a computer, a reuse pattern, based on the mapping, including one or more reuse sets of stations, included in said one or more stations, capable of sharing a transmission resource, wherein said generating comprises:
sorting the one or more stations in increasing order based on their respective mapped interference levels,
beginning with a station, among the one or more stations, with a smallest interference level, adding the station to the reuse set, and
adding an additional station with a next lowest interference level to the reuse set, as long as a cumulative interference level within the reuse set is below a threshold interference level and the additional station is not already assigned to another reuse set.

15. An apparatus comprising:
means for mapping interference levels occurring at one or more stations in a wireless network; and
means for generating a reuse set, based on the mapping, of stations, included in said one or more stations, capable of sharing a transmission resource, wherein said means for generating comprises:
means for sorting the one or more stations in increasing order based on their respective mapped interference levels,
means, beginning with a station, among the one or more stations, with a smallest interference level, for adding the station to the reuse set, and
means for adding an additional station with a next lowest interference level to the reuse set, as long as a cumulative interference level within the reuse set is below a threshold interference level and the additional station is not already assigned to another reuse set.

16. A system for generating a reuse group based on interference levels in an Institute of Electrical and Electronics Engineers (IEEE) 802.16 network, comprising:
means for mapping interference levels, occurring at one or more stations, each of said one or more stations being a base station or a relay station;
means for generating a reuse pattern, based on the mapped interference levels, including one or more reuse sets of stations, included in said one or more stations, capable of sharing a transmission resource, wherein
within each reuse set, the stations are listed in increasing order based on their respective interference levels, and
an additional station is added to a reuse set, as long as the cumulative interference level within the reuse set is below a threshold interference level and the additional station is not already listed in another reuse set;
means for removing empty reuse sets; and
means for generating a network schedule, by a network management entity, based on the reuse pattern to increase bandwidth efficiency in the network.

17. The method of claim 1, wherein said generating comprises:
repeating said adding an additional station until, for each respective station of said one or more stations,
the respective station has been added to the reuse set, or
it has been determined that the respective station cannot be added to the reuse set since the cumulative interference level would not be below the threshold interference level or the respective station was already assigned to another reuse set.

18. The method of claim 14, wherein said generating comprises:
repeating said adding an additional station until, for each respective station of said one or more stations,
the respective station has been added to the reuse set, or
it has been determined that the respective station cannot be added to the reuse set since the cumulative interference level would not be below the threshold interference level or the respective station was already assigned to another reuse set.

19. The apparatus of claim 15, wherein said means for generating comprises:
means for repeating said adding an additional station until, for each respective station of said one or more stations,
the respective station has been added to the reuse set, or
it has been determined that the respective station cannot be added to the reuse set since the cumulative interference level would not be below the threshold interference level or the respective station was already assigned to another reuse set.

20. The method of claim 1, wherein said one or more stations includes at least one relay station.

21. The method of claim 14, wherein said one or more stations includes at least one relay station.

22. The apparatus of claim 15, wherein said one or more stations includes at least one relay station.

23. The system of claim 16, wherein said one or more stations includes at least one relay station.

* * * * *